United States Patent Office 3,539,910
Patented Nov. 10, 1970

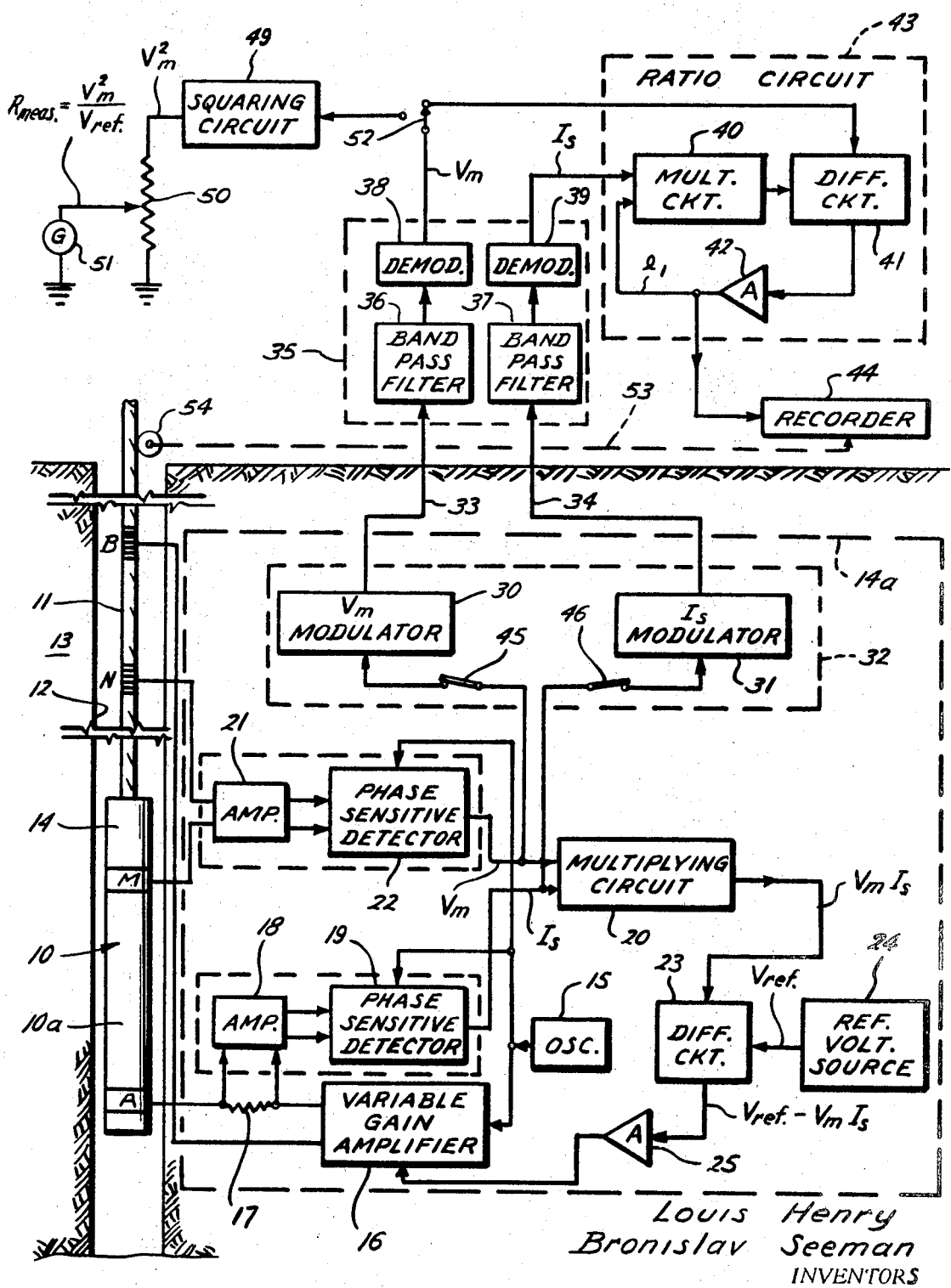

3,539,910
METHODS AND APPARATUS FOR INVESTIGATING EARTH FORMATIONS WHEREIN A FIXED RELATIONSHIP IS MAINTAINED BETWEEN EMITTED CURRENT AND MEASURED POTENTIAL DIFFERENCE
Louis Henry, Chevilly-Larue, Val-de-Marne, and Bronislav Seeman, Meudon, Hauts-de-Seine, France, assignors to Schlumberger Technology Corporation, New York, N.Y., a corporation of Texas
Filed Oct. 29, 1968, Ser. No. 771,517
Claims priority, application France, Nov. 16, 1967, 28,399
Int. Cl. G01v 3/18
U.S. Cl. 324—1                                    19 Claims

ABSTRACT OF THE DISCLOSURE

In accordance with an illustrative embodiment of the present invention, an electrode array having survey current-emitting and return electrodes and a pair of potential measuring electrodes is moved through a borehole. Survey current is passed between the current-emitting and return electrodes for emission into the surrounding formations. The amount of emitted current is measured, as is the potential difference set up between the potential measuring electrodes. The product of the measured survey current and measured potential difference is taken and the survey current is adjusted to maintain this product substantially constant. To provide a measure of formation resistivity or conductivity, either the measured current or measured voltage, or the ratio therebetween can be utilized.

---

This invention relates to methods and apparatus for investigating earth formations traversed by a borehole, and more particularly, to methods and apparatus of the so-called electrical logging type.

In such electrical well logging investigating apparatus, an array of electrodes is moved through a borehole for measuring the electrical resistivity or conductivity of earth formations adjoining the borehole. In one form of this type of investigating apparatus, survey current is emitted from a survey current electrode and the potential difference between two other spaced apart electrodes is measured to provide a measure of the formation resistivity. In another type of investigating apparatus, the emitted survey current is focused by focusing current emitted from nearby focusing electrodes located on either side of the survey current electrode so as to confine the survey current to a narrow sheet of current which penetrates the formation rather deeply.

In any case, it has been the practice in the past to either maintain the voltage constant and measure the survey current variations or to maintain the survey current constant and measure the voltage variations. Usually, the voltage of interest is the voltage potential difference measured between either the survey electrode or a nearby electrode and an electrode remotely located from the survey current electrode. Well logging systems utilizing both constant current and constant voltage modes of operation are disclosed in U.S. Patent No. 2,803,796 granted to N. A. Schuster on Aug. 20, 1957.

When investigating formations with these electrical logging type of investigating systems, the dynamic range of resistivities encountered in the formation is usually extremely high thus placing severe operating conditions on the measurement, transmission and recording apparatus. As disclosed in copending application Serial No. 709,838 filed on Mar. 1, 1968 by G. Attali, the recording problems can be taken care of by recording the resistivity or conductivity measurements in logarithmic form to thereby obtain a compressed scale recording.

As concerns the measurement apparatus, whenever either the voltage or current is maintained constant, wide fluctuations in formation resistivity will produce proportionally wide variations in the power required for operation of the current-emitting electrodes. Moreover, in focused systems, wide variations in formation resistivity will produce wide variations in the amount of focusing power required. These wide power fluctuations will tend to place severe design criteria on the measuring apparatus.

This large dynamic range of measurement values also places severe design criteria on the transmission circuits. If amplitude modulation is used, the transmission system must be capable of accurately transmitting the lowest possible amplitude levels without interference from signals on other cable conductors, or noise. Thus, the highest amplitude levels would tend to be very great. Since there are usually a number of conductors carried by the support cable for transmitting signals between the downhole investigating apparatus and the equipment located at the surface of the earth, the amplitude modulated transmission signals have to be very large to enable accurate transmission of low signal levels. This, then, would give rise to the danger of cross-talk with other cable conductors, thus causing interference with other signal channels.

It is well known that many of these transmission problems can be circumvented by utilizing a frequency modulation or pulse code modulation form of transmission. However, for good resolution, the frequency band required for the transmission of such large dynamic range resistivity or conductivity measurements should be very high. Since the acceptable transmission frequency band for a long well logging cable is not too great anyway, it may be difficult to provide acceptable resolution for the well logging measurements within the usual cable frequency band. Moreover, it is more and more the case that multiple well logging exploring devices are carried by one support member for making a plurality of measurements during one pass through a borehole. Since there are only a limited number of cable conductors available in the usual well logging cables, it is becoming more and more important to transmit information from several different sources over the same transmission channel (i.e., over the same conductor pair). Thus, if one well logging measurement having a large dynamic range takes a large frequency band, there would probably not be a sufficient frequency band on any given transmission channel for the transmission of other information.

One suggested technique which will place less severe design-criteria or limits on at least the transmission equipment is to provide a scale compression function former, such as a logarithmic converter, in the downhole investigating apparatus so as to reduce the dynamic range of the measurement values. However, the severe condition, such as high temperature found in a borehole many thousands of feet in the earth make it very difficult, at best, to accurately convert the well logging measurement signals to a logarithmic function thereof.

It is therefore an object of the present invention to provide new and improved methods and apparatus for investigating earth formations.

It is a further object of the present invention to provide new and improved methods and apparatus for investigating earth formations wherein the dynamic range of the measurement signals can be substantially reduced while still maintaining a high degree of measurement resolution.

In accordance with the present invention, methods and apparatus for measuring a characteristic of earth formations traversed by a borehole comprises moving an electrode array through a borehole and passing current to at least one electrode of the array for emission into a formation surrounding the borehole. The potential difference between at least two electrodes of the electrode array and the amount of current emitted are then measured and the magnitude of the emitted current is adjusted to maintain a given fixed relationship between the magnitude of the emitted current and the measured potential difference. Desirably, as concerns the given relationship, the product of the emitted current and the measured potential difference is maintained substantially constant. To produce the resistivity or conductivity measurement, the ratio of the emitted current and potential difference measurements can be taken or, if the product of these two measurements is maintained sufficiently constant, either the potential or current measurement alone can be used.

For a better understanding of the present invention, together with other and further objects thereof, reference is had to the following description taken in connection with the accompanying drawings, the scope of the invention being pointed out in the appended claims.

Referring to the drawing:

The single figure of drawing illustrates an investigating apparatus lowered in a borehole for investigating subsurface earth formations along with a schematic representation of its associated electrical circuitry in accordance with one form of the present invention.

Now referring to the single figure of drawing, there is shown an exploring device 10 supported on the end of a cable 11 in a borehole 12 for investigating subsurface earth formations 13. The exploring device includes an array of electrodes comprising a current-emitting electrode A and a nearby voltage measuring electrode M, both of which are located on a longitudinal support member 10a. A second voltage measuring electrode N and a current return electrode B are located on the cable 11 some suitable distance above the longitudinal support member 10a with the current return electrode B located above the measuring electrode N. The longitudinal support means 10a includes a fluid-tight housing 14 which contains the downhole electronic circuitry.

Now referring to the right side of the borehole 12, there is shown schematically the downhole electronic circuitry which is contained within the housing 14, the dash line box 14 corresponding to the fluid-tight housing 14. An oscillator 15 supplies an output signal at a suitable frequency to a variable gain amplifier 16. The output current from the variable gain amplifier 16 is supplied between the current-emitting electrode A and the current return electrode B to thereby emit survey current into the formations 13. A low value resistor 17 is placed in series with the survey current electrode A and the variable gain amplifier 16 so that a voltage representative of the magnitude and phase of the survey current will be developed thereacross.

A measure amplifier 18 is responsive to this voltage developed across resistor 17 for applying a signal proportional to the emitted survey current to a phase-sensitive detector 19. The phase-sensitive detector 19 derives its reference signal from the oscillator 15 so as to produce an output signal proportional to that portion of the measured survey current which is in-phase with the oscillator 15 output signal. This output signal from detector 19, designated $I_s$, is applied to one input of a multiplying circuit 20.

To derive the other input to the multiplying circuit 20, a measure amplifier 21 having a high input impedance is responsive to the potential difference between the potential measuring electrodes M and N for supplying a signal proportional to this potential difference to a phase-sensitive detector 22. The phase-sensitive detector 22 derives its phase reference signal from the oscillator 15 so as to produce an output signal proportional to that portion of the measured potential difference which is in-phase with the oscillator signal. This output signal from the detector 22, designated $V_m$, is then applied to the other input of the multiplying circuit 20.

The output signal from the multiplying circuit 20 will thus be proportional to the product of the measured potential difference signal $V_m$ and the measured survey current signal $I_s$. This product signal $V_m I_s$ is then applied to a suitable subtraction circuit 23, such as a differential amplifier, which subtracts the product signal from a DC reference voltage $V_{ref}$ derived from a reference voltage source 24. The resulting difference signal $V_{ref} - V_m I_s$ is then applied to an amplifier 25 which amplifies this difference signal and applies it to the gain control input of the variable gain amplifier 16. By this feedback arrangement, the difference signal is maintained at substantially zero volts.

Summarizing the operation of the downhole measuring circuitry, the variable gain amplifier 16, in response to the oscillator 15 output signal, supplies survey current to the survey current electrode A for emission into the surrounding earth formations. Thus survey current returns to the current electrode B on a cable 11 for return to the amplifier 16. The circuitry comprising resistor 17, amplifier 18, and phase-sensitive detector 19 operates to measure the magnitude of the survey current and the amplifier 21 to provide the signal $I_s$ and the phase-sensitive detector 22 operates to measure the potential difference between the measuring electrodes M and N to provide the signal $V_m$. The multiplying circuit 20 takes the product of the voltage and current signals $V_m$ and $I_s$ to provide a signal proportional to the product $V_m I_s$. It is clear that this product signal will be proportional to the "real" or "in-phase" power dissipated in the volume of formation which is producing the variations in the measured voltage difference $V_m$.

The difference circuit 23 subtracts the product signal $V_m I_s$ from the reference signal $V_{ref}$ so as to adjust the gain of the variable gain amplifier 16 to maintain the output voltage from difference circuit 23 substantially equal to zero volts. The gain of the feedback system just described will determine how close to zero volts the difference between $V_{ref}$ and $V_m I_s$ will be.

Thus, the relationship between $V_m I_s$ and $V_{ref}$ can be written as:

$$V_m I_s = k V_{ref} \quad (1)$$

where $k$ is a gain factor determined by the gain of the feedback system described above. Furthermore, it is known that the measured formation resistivity $R_m$ is:

$$R_m = \frac{V_m}{I_s} \quad (2)$$

Combining Equations 1 and 2 to produce $V_m$ and $I_s$, we have:

$$V_m = \sqrt{k V_{ref} R_m} \quad (3)$$

and $$I_s = \sqrt{\frac{k V_{ref}}{R_m}} \quad (4)$$

From Equations 3 and 4, it is clear that the dynamic range of the individual $V_m$ and $I_s$ signals will be reduced by a square root factor. If the gain of the above-described feedback system is sufficiently high for $k$ to remain constant, only one parameter $V_m$ or $I_s$ need be transmitted to the surface of the earth. If, on the other hand, the gain is so low that $k$ becomes variable, both $V_m$ and $I_s$ should be transmitted to the surface of the earth to enable $R_m$ to be determined.

To provide such an indication of the measured resistivity $R_m$ at the surface of the earth, the quantities $V_m$ and $I_s$ are applied to a pair of modulators 30 and 31 contained within a transmitting circuit 32. The modulators 30 and 31 can provide any desirable type of modulation such as, for example, amplitude modulation, frequency modulation, or pulse code modulation. The transmitting circuits 32 can also include suitable cable driving circuits (not shown). The modulated signals from the modulators 30 and 31 are applied to a pair of cable conductors 33 and 34, respectively, for transmission to the surface of the earth. The return conductor (not shown) could comprise the armor of the cable 11, if desired. If desired, the $V_m$ and $I_s$ information could both be transmitted on the same transmission channel, i.e., on one conductor pair by utilizing separate frequencies for the $V_m$ and $I_s$ information.

At the surface of the earth, the cable conductors 33 and 34 are applied to a suitable receiving circuit 35 which includes a pair of band-pass filters 36 and 37 tuned to the transmission frequencies (or frequency bands if FM is used) produced by the modulators 30 and 31. Suitable demodulators 38, 39 are responsive to the filtered transmission signals for producing DC signals proportional to $V_m$ and $I_s$ respectively.

For the case where both the $V_m$ and $I_s$ signals are necessary to determine the formation resistivity $R_m$, the $I_s$ signal is applied to one input of a multiplying circuit 40 whose output signal is applied to one input of a difference circuit 41. The other input to the difference circuit 41 is the measure signal $V_m$ supplied from the demodulator 38 via a double-throw switch 52. The output signal from the difference circuit 41 is applied to the input of a relatively high gain amplifier 42 whose output signal is applied to the other input of the multiplying circuit 40. By making the gain of amplifier 42 high, amplifier 42 will supply sufficient voltage to the multiplying circuit 40 to cause the output voltage from the difference circuit 41 to be substantially equal to zero. Thus, if the output voltage from amplifier 42 is designated $e_1$, the output signal from multiplying circuit 40 will be equal to $I_s \times e_1$. Since the output signal from the difference circuit 41 is substantially equal to zero volts because of the feedback operation, it is clear that $I_s \times e_1$ will equal $V_m$. Thus, the voltage $e_1$ is equal to $V_m/I_s$, which is the resistivity $R_m$ of the formation 13. This resistivity signal is then recorded by a recorder 44 which is driven as a function of borehole depth by a mechanical linkage 53. The linkage 53 is coupled to a rotating wheel 54 which is in engagement with the cable 11.

As discussed earlier, if the gain of the downhole feedback loop is sufficiently high, only one signal, either $V_m$ or $I_s$, need be transmitted to the surface of the earth. From Equation 3, since $V_{ref}$ is a known quantity, it is clear that the voltage signal $V_m$ is proportional to the square root of formation resistivity $R_m$. Thus, by simply transmitting the signal $V_m$ to the surface of the earth, which is represented in the downhole equipment by closing a switch 45 and opening a switch 46, an indication of formation resistivity can be obtained at the surface of the earth. Moreover, the dynamic range of this resistivity signal $V_m$ will be substantially less than is usually the case since it is proportional to $\sqrt{R_m}$. Thus, all of the previously discussed advantages incurred by transmitting low dynamic range signals will be obtained and yet a high resolution indication of formation resistivity $R_m$ can be obtained.

To provide such an indication, the signal $V_m$ could be recorded directly with a suitably calibrated recorder or a signal directly proportional to resistivity could be obtained by electronic means. Thus, a double-throw switch 48 can switch the $V_m$ signal to the input of a squaring circuit 49. The resulting squared signal, $V_m^2$, is applied to a suitable potentiometer 50 which divides the quantity $V_m^2$ by a factor proportional to $kV_{ref}$ to provide a signal proportional to the measured resistivity $R_m$. This $R_m$ signal is indicated or recorded by a suitable galvanometer 51.

As an alternative, if desired, the same arrangement could be utilized for the $I_s$ signal. Thus, the switch 46 could be closed and the switch 45 opened so that only the $I_s$ signal is transmitted to the surface of the earth. This $I_s$ signal can then be applied to the squaring circuit 49, potentiometer 50, and galvanometer 51 so as to provide a measure of the conductivity of the adjoining formations. It is, of course, to be understood that if one of these last two alternative embodiments were utilized, only one transmission channel would be necessary and the switches 45 and 46 would not be necessary.

It is to be understood that even though a portion of the circuitry has been shown located within the investigating apparatus in the borehole, all or most of the electronic circuitry could be located at the surface of the earth just as well. Additionally, instead of utilizing a non-focused electrode arrangement, a focused electrode array could be utilized just as well. In this case, by reducing the dynamic range of the survey current, the dynamic range of the focusing current utilized to focus the survey current would likewise be reduced. Additionally, suitable logarithmic converters could be utilized to provide the various multiplying and dividing functions discussed above.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
   an electrode array;
   means for mounting said electrode array for passage through a borehole;
   means for passing current to at least one electrode of said electrode array for emission into a formation surrounding a borehole;
   means for measuring the potential difference between at least two electrodes of said electrode array; and
   means simultaneously responsive to said emitted current and said measured potential difference for adjusting said emitted current to maintain a substantially fixed relationship between said emitted current and measured potential difference whereby a measure of a formation characteristic can be obtained.

2. Apparatus for investigating earth formations traversed by a borehole, comprising:
   an electrode array;
   means for mounting said electrode array for passage through a borehole;
   means for supplying current between at least two electrodes of said electrode array for emission into a formation surrounding a borehole and generating an output signal representative of said emitted current;
   means for measuring the potential difference between at least two electrodes of said electrode array;
   means simultaneously responsive to said output signal and said measured potential difference for adjusting said emitted current to maintain a substantially fixed relationship between said emitted current and measured potential difference; and
   means responsive to the relationship of said measured potential difference to said output signal for determining the resistivity or conductivity of a formation.

3. Apparatus for investigating earth formations traversed by a borehole, comprising:
   an electrode array;
   means for mounting said electrode array for passage through a borehole;
   means for supplying current between two electrodes of said electrode array for emission into a formation surrounding a borehole;

means for measuring the potential difference between at least two electrodes of said electrode array;

means for measuring the magnitude of said emitted current;

means for determining the product of said measured current and said measured potential difference and generating an output signal representative thereof;

means responsive to said product signal for adjusting the magnitude of said emitted current to maintain said product signal substantially constant; and means responsive to one of said measured current or measured potential difference for obtaining a measure of the resistivity or conductivity of a formation.

4. Apparatus for measuring a characteristic of earth formations traversed by a borehole, comprising:

an electrode array having a current-emitting electrode for emitting survey current into a selected formation region and a spaced apart current return electrode for receiving said emitted current from a formation, and a pair of potential measuring electrodes individually spaced apart from said current-emitting and current return electrodes;

means for mounting said electrodes for passage through a borehole;

means for passing current between said current-emitting and current return electrodes for emission into a formation surrounding a borehole;

means for measuring the potential difference between said potential measuring electrodes; and means simultaneously responsive to said emitted current and said measured potential difference for adjusting the magnitude of said emitted current to maintain a substantially fixed relationship between said emitted current and measured potential difference whereby a measure of a formation characteristic can be obtained.

5. Apparatus for measuring a characteristic of earth formation traversed by a borehole, comprising:

an electrode array;

means for mounting said electrode array for passage through a borehole;

means for passing current to at least one electrode for emission into a selected formation region surrounding a borehole;

means for measuring the electric field produced by said emitted current in a selected formation region; and means simultaneously responsive to said emitted current and said measured electric field for adjusting the magnitude of said emitted current to maintain a substantially fixed relationship between said emitted current and measured electric field whereby a measure of a formation characteristic can be obtained.

6. Apparatus for measuring a characteristic of earth formations traversed by a borehole, comprising:

an electrode array;

means for mounting said electrode array for passage through a borehole;

means for generating a reference signal at a given frequency;

amplifying means for passing said reference signal between two electrodes of said electrode array for emission into a formation surrounding a borehole;

means for measuring the current passed between said two electrodes;

means for measuring the potential difference between at least two electrodes of said electrode array; and means simultaneously responsive to said measured current and said measured potential difference for adjusting the gain of said amplifying means to maintain a substantially fixed relationship between said measured current and measured potential difference whereby a measure of a formation characteristic can be obtained.

7. Apparatus for measuring a characteristic of earth formations traversed by a borehole, comprising:

an electrode array having a current-emitting electrode for emitting survey current into a selected formation region and a spaced apart current return electrode for receiving said emitted current from a formation, and a pair of potential measuring electrodes individually spaced apart from said current-emitting and current return electrodes;

means for mounting said electrodes for passage through a borehole;

means for generating a reference signal at a given frequency;

amplifying means responsive to said reference signal for passing current between said current-emitting and current return electrodes for emission into a formation surrounding a borehole;

means for measuring the potential difference between said potential measuring electrodes and generating a first output signal representative thereof;

means for measuring said survey current and generating a second output signal representative thereof; and means simultaneously responsive to said measured survey current and said measured potential difference for adjusting the gain of said amplifying means to adjust said survey current for maintaining a substantially fixed relationship between said emitted survey current and measured potential difference whereby a measure of a formation characteristic can be obtained.

8. The apparatus of claim 7 wherein said means for measuring the potential difference between said potential measuring electrodes includes means responsive to the potential difference between said potential measuring electrodes and said reference signal for developing a first output signal representative of that component of the measured potential difference signal which is in-phase with the reference signal; and said means for measuring survey current includes means responsive to said survey current and said reference signal for developing a second output signal representative of that component of the survey current which is in-phase with said reference signal.

9. The apparatus of claim 8 wherein said means for adjusting the gain of said amplifying means includes means for multiplying said first and second output signals together to produce a product signal, means for comparing said product signal with a reference voltage and producing a gain control signal representative of the difference between said product signal and reference voltage for application to said amplifying means to control the gain thereof, the gain of said amplifying means being adjusted until said product signal substantially equals said reference voltage.

10. The apparatus of claim 9 and further including means responsive to said first and second output signals for developing a signal representative of the resistivity or conductivity of a formation.

11. Apparatus for measuring a characteristic of earth formations traversed by a borehole, comprising:

an electrode array having a current-emitter electrode for emitting survey current into a selected formation region and a spaced apart current return electrode for receiving said emitted current from a formation, and a pair of potential measuring electrodes individually spaced apart from said current-emitting and current return electrodes;

means for mounting said electrodes for passage through a borehole;

means for generating a reference signal at a given frequency;

amplifying means responsive to said reference signal for passing current between said current-emitting and current return electrodes for emission into a formation surrounding a borehole;

means for measuring the potential difference between said potential measuring electrodes and generating a first output signal representative thereof;

means for measuring said survey current and generating a second output signal representative thereof; and means simultaneously responsive to said measured survey current and said measured potential difference for adjusting the gain of said amplifying means to adjust said survey current for maintaining a substantially fixed relationship between said emitted survey current and measured potential difference and for obtaining a measure of a formation characteristic.

12. A method of measuring a characteristic of earth formations traversed by a borehole, comprising:

moving an electrode array through a borehole;

passing current to at least one electrode of said electrode array for emission into a formation surrounding a borehole;

measuring the amount of current that is emitted;

measuring the potential difference between at least two electrodes of said electrode array; and adjusting the magnitude of said emitted current in response to a simultaneous function of said measured emitted current and said potential difference to maintain a substantially fixed relationship between said emitted current and measured potential difference whereby a measure of a formation characteristic can be obtained.

13. A method of measuring a characteristic of earth formations traversed by a borehole, comprising:

moving an electrode array through a borehole;

passing current to at least one electrode of said electrode array for emission into a formation surrounding a borehole;

measuring the amount of current that is emitted;

measuring the potential difference between at least two electrodes of said electrode array;

adjusting the magnitude of said emitted current in response to a simultaneous function of said measured emitted current and said potential difference to maintain a substantially fixed relationship between said emitted current and measured potential difference; and obtaining a measure of the resistivity or conductivity of a formation from the measure of said emitted current or potential difference.

14. A method of measuring a characteristic of earth formations traversed by a borehole, comprising:

moving an electrode array through a borehole;

passing current to at least one electrode of said electrode array for emission into a formation surrounding a borehole;

measuring the amount of current that is emitted and generating a first output signal representative thereof;

measuring the potential difference between at least two electrodes of said electrode array and generating a second output signal representative thereof;

multiplying said first and second output signals together to produce a product signal;

comparing said product signal with a reference voltage and generating a control signal representative of the difference therebetween; and adjusting the magnitude of said emitted current in response to said control signal to maintain said product signal substantially equal to said reference voltage whereby a measure of a formation characteristic can be obtained.

15. A method of measuring a characteristic of earth formations traversed by a borehole, comprising:

moving an electrode array through a borehole;

passing current to at least one electrode of said electrode array for emission into a formation surrounding a borehole;

measuring the amount of current that is emitted and generating a first output signal representative thereof;

measuring the potential difference between at least two electrodes of said electrode array and generating a second output signal representative thereof;

multiplying said first and second output signals together to produce a product signal;

comparing said product signal with a reference voltage and generating a control signal representative of the difference therebetween;

adjusting the magnitude of said emitted current in response to said control signal to maintain said product signal substantially equal to said reference voltage; and deriving a measure of the resistivity or conductivity of a formation from said first and second output signals.

16. Apparatus for investigating earth formations traversed by a borehole comprising:

an electrode array;

means for mounting said electrode array for passage through a borehole;

means for passing current to at least one electrode of said electrode array for emission into a formation surrounding a borehole;

means for measuring the potential difference between at least two electrodes of said array; and means responsive to the emitted current and said measured potential difference for controlling the magnitude of said emitted current in accordance with a predetermined and continuous functional relationship which is maintained between said emitted current and said measured potential difference.

17. The apparatus of claim 16 wherein said means for controlling the magnitude of said emitted current in accordance with a predetermined and continuous functional relationship which is maintained between said emitted current and said measured potential difference comprises means for controlling the magnitude of said emitted current in accordance with a multiplicative relationship of said emitted current and said measured potential difference which is kept aproximately constant in value.

18. Apparatus for investigating earth formations traversed by a borehole comprising:

an electrode array;

means for mounting said electrode array for passage through a borehole;

means for passing current to at least one electrode of said electrode array for emission into a formation surrounding a borehole;

means for measuring the potential difference between at least two electrodes of said array;

means for monitoring the emitted current from said electrode array;

means continuously responsive to said emitted current and said measured potential difference for maintaining the inphase power emitted into the formation approximately at a constant value.

19. Apparatus for investigating earth formations traversed by a borehole comprising:

an electrode array;

means for mounting said electrode array for passage through a borehole;

means for passing current to at least one electrode of said electrode array for emission into a formation surrounding a borehole;

means for measuring the potential difference between at least two electrodes of said array;

means for monitoring the emitted current from said electrode array;

means for generating a signal proportional to a multiplicative and continuous function of said emitted current and said measured potential difference;

means for generating a reference voltage signal;

means for generating a control signal which is propor-

11 tional to the difference of said multiplicative and continuous function signal and said reference voltage signal; and means for applying said control signal to said means for passing current to at least one electrode of said array to control said emitted current in accordance with said multiplicative and continuous function.

References Cited
UNITED STATES PATENTS

| | | | |
|---|---|---|---|
| 2,776,402 | 1/1957 | Kokesh | 324—1 |
| 2,803,796 | 8/1957 | Schuster | 324—1 |
| 3,031,612 | 4/1962 | Easterling | 324—1 |
| 3,056,917 | 10/1962 | Tanguy | 324—1 |
| 3,119,061 | 1/1964 | Tanguy | 324—1 XR |
| 3,388,324 | 6/1968 | Sloughter | 324—10 |

GERARD R. STRECKER, Primary Examiner

U.S. Cl. X.R.

324—10